Oct. 24, 1950 E. E. MASTERSON 2,527,436

PROTECTING SYSTEM FOR CAMERA VIEWING AREAS

Filed March 31, 1948

INVENTOR.
EARL E. MASTERSON
BY Arl R. Gorham
ATTORNEY

Patented Oct. 24, 1950

2,527,436

UNITED STATES PATENT OFFICE 2,527,436

PROTECTING SYSTEM FOR CAMERA VIEWING AREAS

Earl E. Masterson, Palmyra, N. J., assignor to Radio Corporation of America, a corporation of Delaware Application March 31, 1948, Serial No. 18,216

3 Claims. (Cl. 177—311)

This invention relates to a signal or warning system for positioning a sound pickup device, such as a microphone, used on a motion picture or television set, or for indicating the limits of movement of any object about a restricted area.

In the production of sound motion pictures, a microphone is usually mounted on the end of a boom and the boom maneuvered to place the microphone as closely as possible to the actor or actress or other source of sound to be recorded during the photographing of the picture. It is difficult many times for the boom operator to accurately judge the camera viewing or photographing angle, particularly when different focal length lenses are used, and it thus frequently happens that the operator brings the microphone within the camera angle and it is photographed. If this occurs in motion picture production, retakes may be made. However, in the production of television programs, it is particularly desirable to prevent the pickup microphone from being seen by the television camera, and thus, be transmitted with the picture.

The present invention provides a signal or warning indication such as a lamp, which will be energized when the microphone boom approaches the area which is being registered on the motion picture film or television camera. This is accomplished by projecting a modulated beam of light which has either a slightly wider angle than the camera lens or a displaced angle in the area where a microphone is manipulated. The light will be modulated at any suitable frequency, while the amplifier would preferably be a band-pass amplifier peaked at the light modulated frequency. This frequency should not be a fundamental or multiple of sixty cycle or that of the frequency of the set illumination. The light could be created by a crater or gaseous lamp, or by an incandescent lamp in conjunction with a light chopper wheel.

The principal object of the invention, therefore, is to prevent a sound pickup microphone being moved within a camera viewing angle.

Another object of the invention is to provide an improved method of and system for preventing a microphone from being moved into a camera viewing angle.

A further object of the invention is to provide an alarm or warning system for indicating when an object is approaching a predetermined area.

A still further object of the invention is to provide a signal system wherein an indication is given when an object such as a sound pickup microphone approaches a restricted area, such as the area being photographed or televised.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
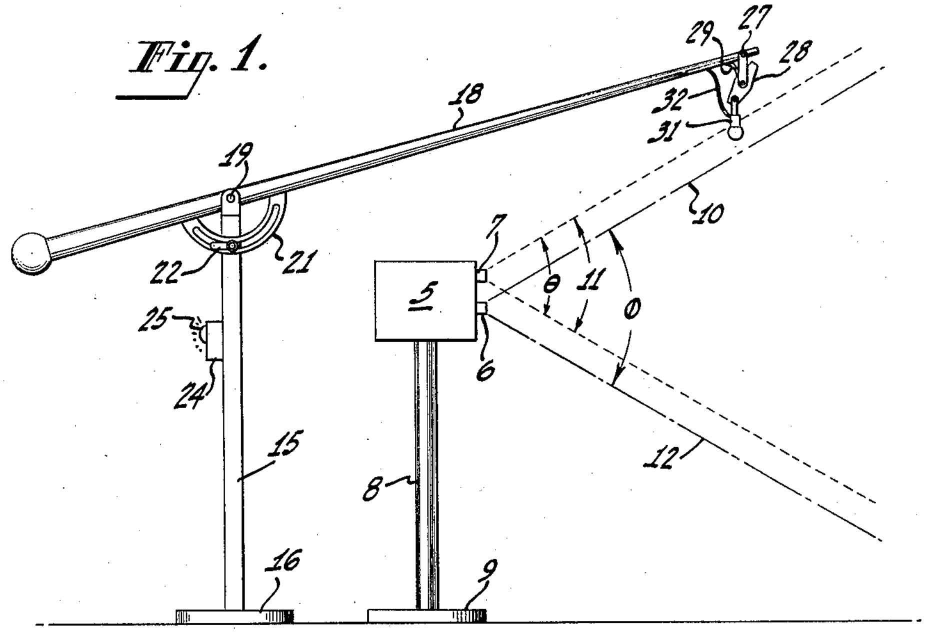
Fig. 1 is an elevational view showing the invention in operation.

Referring now to the drawings, in which the same numerals identify like elements, a motion picture or television camera is shown generally at 5 having a pickup lens 6 and which may be mounted in any suitable manner, such as on a standard 8 having a base 9. Included in the unit 5, is a light modulator having a projection lens 7. The dot-and-dash lines 10 indicate the viewing or photographing angle $\varphi$ of the lens 6, while the dotted lines 11 indicated the projection angle $\theta$ of the lens 7. This illustration is one showing the projection angle to be substantially the same as the camera viewing angle, but displaced therefrom to form a protecting border area for the viewing angle area. Thus, the upper limit of the projection angle $\theta$ is above the upper limit of angle $\varphi$, so that any object approaching the camera lens 6 field will first come within the field of lens 7. The lens 7 may also have a wider projection angle, the dotted lines 11 thus crossing the dot-and-dash lines 10 to form a tapered border zone around the viewing angle area.

Mounted on another support 15 having a base 16, is a microphone boom 18, which is rotatable about the vertical axis of the standard 15 and pivoted on a horizontal axis 19. A locking device is provided by the slotted bracket 21 and hand screw 22. Also mounted on the standard 15 is an alarm or signal box 24 containing a signal lamp 25. At the far end of the microphone boom 18 there is mounted a bracket 27 supporting a microphone 28 to which is connected a cable 29 feeding the output of the microphone to the usual sound amplifier. Also shown mounted at a point on the microphone 28 is a photocell unit 31 having an output cable 32. Although the photocell 31 is shown mounted on the microphone, it may also be mounted on an additional bracket attached to the microphone boom, particularly when the microphone is adapted to be rotated during recording or transmission. As mentioned above, the photocell 31 will come within the projection angle of the lens 7 before it reaches the pickup angle of the lens 6, and when it does come within the field of lens 7, the lamp 25 will be energized and its illumination indicate to the boom man that he is approaching the restricted photographing area within the angle φ. When this occurs, he can raise or shift the microphone to a point where the lamp 25 is extinguished.

Figure 2:
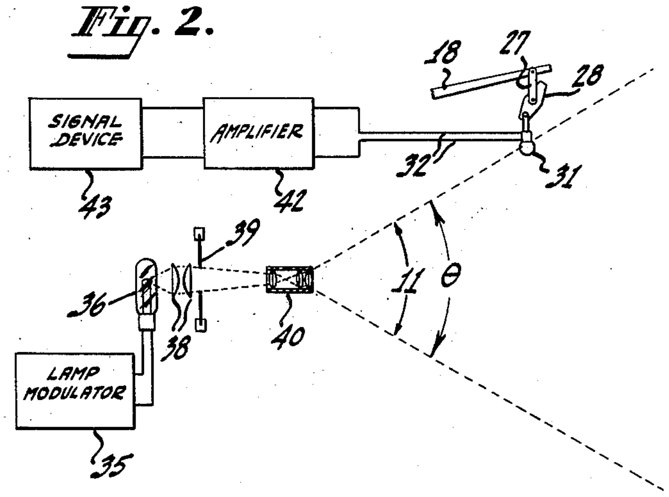
Fig. 2 is a diagrammatic view showing the transmitter and receiver portion of the invention.

Referring now to Fig. 2, in which the components of the warning system are illustrated, a lamp modulator unit 35 may include an electrical oscillator feeding a crater or gaseous lamp 36. Light from the lamp is gathered by lenses 38 and projected through an aperture in the plate 39 to a projection lens unit 40. By varying the aperture in the plate 39, the projection angle θ may be varied and the protective zone increased and decreased. Modulated light may also be obtained by placing a rotating chopper wheel at any point between the lamp 36 and the unit 40, the lamp 36 then being a constant intensity lamp.

The photoelectric cell 31 is connected by conductors 32 to an amplifier 42, which then feeds a signal device 43, such as the lamp 25 in Fig. 1. The units 36, 38, 39, and 40 may be mounted in the camera box 5, so the lens 7 follows the camera lens 6 when the camera is mounted on a universal pan mount or on a dolly or boom, while the amplifier 42 could be included in the signal box 24 of Fig. 1. Thus, a warning system for preventing a microphone from being included in a scene being photographed for motion picture or being televised for television transmission is provided. Although the invention has been illustrated as embodied in a photographing system, it is to be understood that the warning system could also be employed to prevent the intrusion of any particular object in a predetermined restricted area.

I claim:

1. A system for indicating when an object approaches a restricted area being photographed, comprising means for lighting said restricted area for photographing, a source of light characterized differently from that of the photographing light, means for projecting said characterized light beyond the boundary of said restricted area being photographed, means for detecting said characterized light beyond the boundary of said restricted area being photographed, and means for indicating the detection of said characterized light, said object being a sound pickup microphone, and said detecting means being a photoelectric cell.

2. A system for warning of the approach of a microphone toward the photographing angle of a camera lens comprising a camera having a certain photographing angle, a microphone adapted to be moved to different positions for detecting sound waves, a light projecting system projecting light within and beyond portions of the photographing angle of said camera lens, means for characterizing said light to differ from the light used for photographing, and a light detecting means movable with said microphone to intercept said characterized projected light from said light projecting system.

3. A system for warning of the approach of an object toward a zone being photographed, comprising a camera having a predetermined photographing angle, a light projecting means for projecting light between the zone of said photographing angle and an object movable around said zone, means for modulating said projected light to differ from the light used for photographing, means for detecting said modulated light, said last mentioned means being movable with said object to intercept said modulated light from said light projecting means, and means for indicating the detection of said modulated light.

EARL E. MASTERSON.

REFERENCES CITED

The following references are of record in the file of this patent:

UNITED STATES PATENTS

| Number | Name | Date |
|---|---|---|
| 1,655,843 | Reynolds | Jan. 10, 1928 |
| 1,954,204 | Hayes | Apr. 10, 1934 |
| 2,237,193 | Mobsby | Apr. 1, 1941 |
| 2,261,190 | Shropshire | Nov. 4, 1941 |
| 2,269,340 | Gulliksen | Jan. 6, 1942 |
| 2,317,652 | Toney | Apr. 27, 1943 |
| 2,350,820 | Rettenger | June 6, 1944 |
| 2,396,280 | Miller | Mar. 12, 1946 |
| 2,400,152 | Klemperer | May 14, 1946 |
| 2,431,575 | McCune | Nov. 25, 1947 |
| 2,442,240 | Hooker et al. | May 25, 1948 |